United States Patent [19]

Falkinger et al.

[11] 4,042,125

[45] Aug. 16, 1977

[54] METHOD AND APPARATUS FOR STACKING AND FEEDING BLANKS TO A TIERED MULTI-OPENING PRESS FOR THE PRODUCTION OF PRESSED BOARD

[75] Inventors: Willard Falkinger, Farsta; Per Anders Asberg, Taby, both of Sweden

[73] Assignee: Defibrator Aktiebolag, Stockholm, Sweden

[21] Appl. No.: 623,534

[22] Filed: Oct. 17, 1975

[30] Foreign Application Priority Data

Oct. 23, 1974 Sweden .............................. 74133422

[51] Int. Cl.[2] ........................ B65G 65/02; B30B 15/30

[52] U.S. Cl. ................................ 214/6 BA; 100/196; 214/16.6; 214/152; 425/338

[58] Field of Search .................. 214/6 BA, 6 M, 16.6, 214/152; 100/93 P, 96, 196; 425/338; 198/35, 422

[56] References Cited

U.S. PATENT DOCUMENTS

| | | | |
|---|---|---|---|
| 1,942,251 | 1/1934 | Mains | 425/339 |
| 3,077,271 | 2/1963 | Siempelkamp | 214/16.6 |
| 3,506,109 | 4/1970 | Braas | 198/35 |
| 3,664,524 | 5/1972 | Yamauchi | 214/16.6 |
| 3,860,381 | 1/1975 | Pesch | 425/338 |
| 3,866,763 | 2/1975 | Alduk | 214/6 BA |

*Primary Examiner*—L. J. Paperner
*Attorney, Agent, or Firm*—Eric Y. Munson

[57] ABSTRACT

Method and apparatus for producing pressed board and the like in a tiered, multi-opening press, in which the sheet blanks are deposited individually on conveyor platens which are conveyed by conveyor means successively at predetermined intervals to a stacking device. In the stacking device, a predetermined number of platens with their superposed board blanks are successively raised above the conveyor means into retained contact with one another to form a stacked assembly of platens and board blanks. When the predetermined number of platens and board blanks have been stacked, the assembly is lowered onto the conveyor means and transported to tiered racks in an elevator device by which they are successively elevated into alignment with the tiered openings in the multi-opening press to be pressed into board units in a single pressing operation.

8 Claims, 7 Drawing Figures

METHOD AND APPARATUS FOR STACKING AND FEEDING BLANKS TO A TIERED MULTI-OPENING PRESS FOR THE PRODUCTION OF PRESSED BOARD

BACKGROUND OF THE INVENTION

This invention relates to a method and an apparatus for the manufacture of sheets or board units from cellulose or wood fibrous material or shavings by heat and pressure i the interspaces between the press plates of a multi in which, a plurality of sheets simultaneously enter the individual interspaces.

It is known already to introduce sheets into a multi opening press in such a manner that one single sheet is caused to enter each interspace in the press. As saving of time always is an aim in this type of manufacture, it is of greatest importance to shorten as much as possible every working step in the production process. Therefore, it is one main object of the invention to provide a method and an apparatus which makes it possible substantially to shorten the time overall production. This object has been attained by increasing the average feed speed of the sheets according to the invention by introducing two or more sheets simultaneously into each interspace in the multi opening press.

A further object of the invention is to provide a method and an apparatus by which the capacity of the press is increased so that a greater number of sheets or board units can be produced in a single pressing operation with a press having a given height. The aforesaid objects of the invention are substantially realized by the steps of depositing the sheets on conveyor members, such as plates, platens, frames and the like, provided, if desired, with the wire cloth, thereupon stacking said conveyor members one upon the other by movement in vertical direction whereby an overlying conveyor member is brought to bear against the sheet resting on the immediately underlying conveyor member directly against the underlying conveyor member, and thereafter introducing the stacked assembly into a predetermined interspace in the press.

When carrying out the method according to the invention a novel stacking apparatus is utilized which substantially is characterized by a lifting and lowering device by means of which the conveyor members are vertically movable to, and away from, a support device located above a conveyor track, said device being adapted to catch and retain one or more conveyor members during the stacking operation.

Further objects and advantages of the invention will become apparent from the following description of a preferred embodiment considered in connection with the accompanying drawings, which form part of this specification and of which:-

BRIEF DESCRIPTION OF THE DRAWINGS

Corresponding details shown in the various figures have been denoted by the same reference numerals.

Referring now to FIG. 1, there is shown by way of example a system for feeding sheets 12 to a multi opening press 10 which is used in connection with the method and the apparatus according to the invention. The sheets 12, which in some cases may rest on wire cloth 14, are conveyed on an upper conveyor track 16 and are deposited each on an associated conveyor member or platen 18 which platen are fed separately onto a lower conveyor track 20 extending below the upper conveyor track 16. The system with conveyor platen 18, wire cloths 14 and sheets 12 is shown in greater detail in FIGS. 5 to 7. From a stacking apparatus 22 within which the conveyor plates 18 with sheets 12 and wire cloth 14 associated therewith are stacked one upon the other, so that at least two plates 18 are included in each stack, the conveyor plates 18 are conducted to an elevator member 24 known per se. The stacks are fed into various openings which correspond to the interspaces of the multi opening press 10 by the elevator member 24. From the multi opening press 10, the plates 18 with their wire cloth 14 and the board units or sheets are conducted to a further elevator member 16 which is of the same kind as the first-mentioned one. The stacks of superimposed plates are fed to the racks of the elevator member 26 which correspond to the interspaces of the press 10, whereupon the stacked plates 18 are discharged onto the conveyor track 28 for further conveyance and separation. After the wire cloths 14 and the pressed sheets or board units have been removed from the conveyor plates 18, the latter can be returned to the stacking apparatus 22 in some manner known per se. The means for effecting this return movement are not illustrated in the drawings.

FIG. 2 illustrates the operational details of the novel stacking apparatus 22 together with two conveyor means 30 by which the plates 18 are fed to and discharged from the apparatus 22 which is shown schematically in FIG. 1. The feeding-in is effected from the lefthand short side of the elongated stacking apparatus 22 and the discharge from the righthand short side threof. Although two parallel conveyor means 30 are shown in operation within the stacking apparatus 22, their number can, of course, be chosen arbitrarily. Each conveyor means 30 comprises an endless conveyor belt 32 together with associated pulleys 34.

Figure 1:
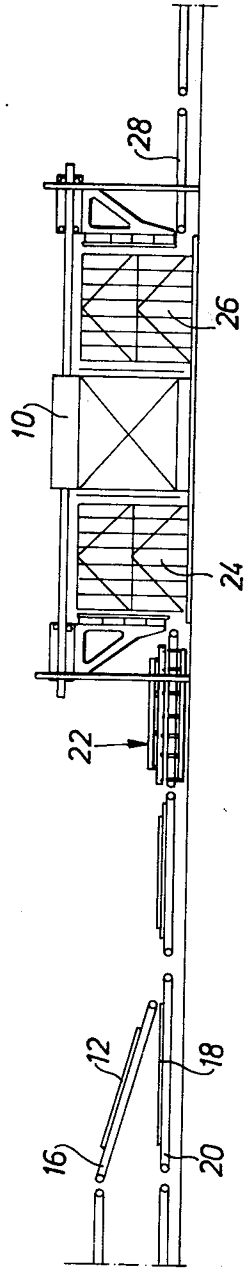
FIG. 1 is a side elevation of a multi opening press with associated feeding devices including the stacking apparatus constructed according to the invention.
Figure 2:
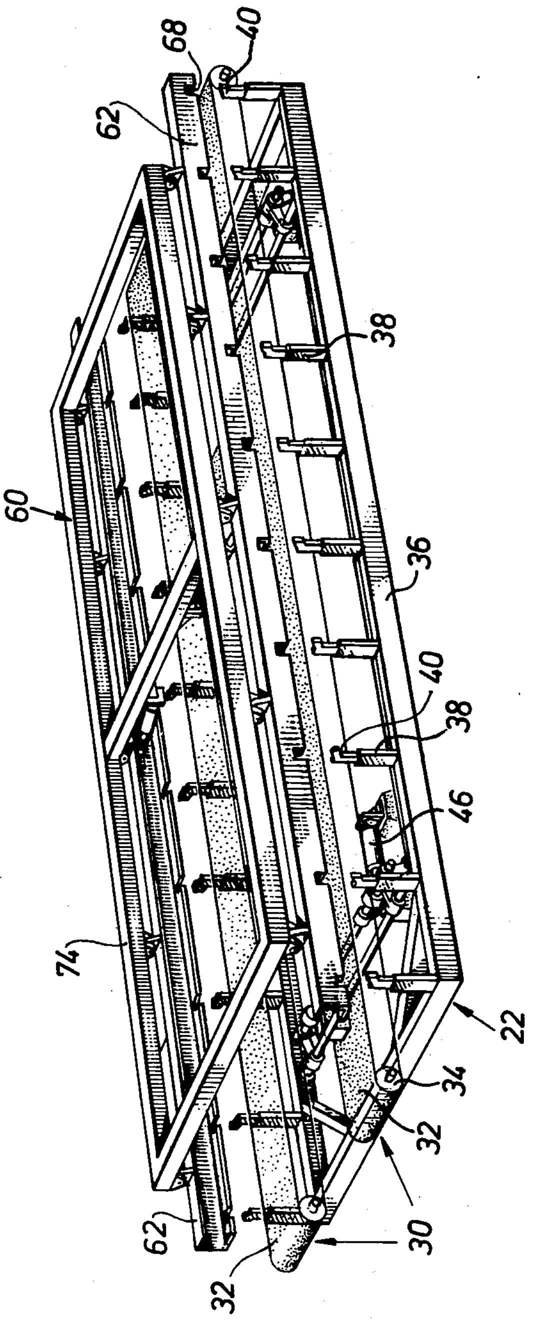
FIG. 2 is a prespective view of the novel stacking apparatus.
Figure 3:
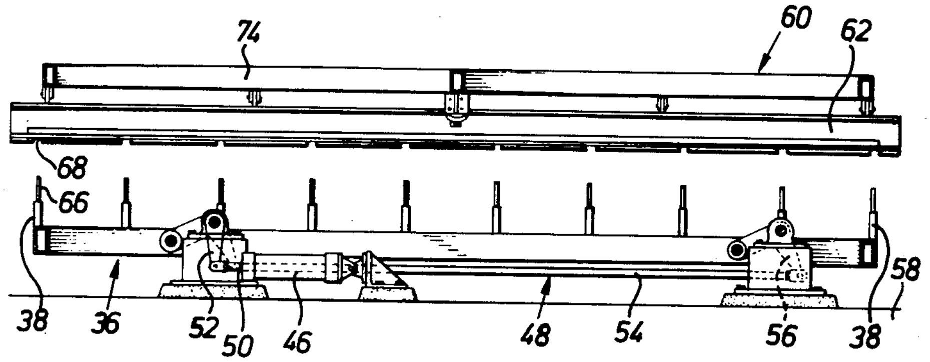
FIG. 3 is a side elevational view of the novel stacking apparatus showing the lifting and lowering device in a lowered position.
Figure 4:
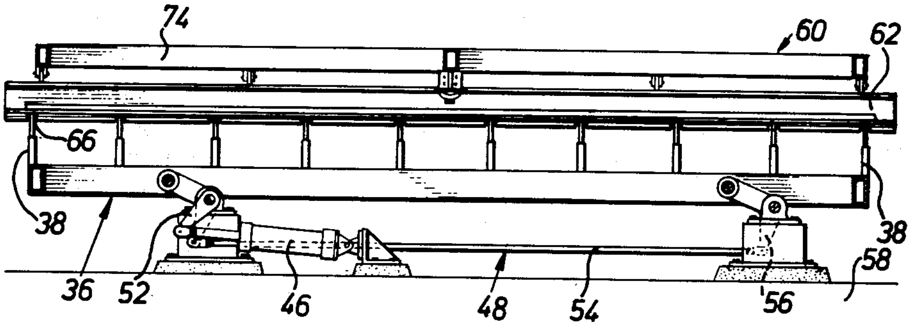
FIG. 4 is a side elevational view of the novel stacking apparatus showing the lifting and lowering device in a raised position.

The novel stacking apparatus 22 includes a lifting and lowering device 36 for vertically moving the loaded conveyor plates 18. The apparatus 36 has along its two longitudinal lateral edges vertically projecting support bars 38. These bars are disposed with mutually equal spacing along the two edges, the number of bars 38 being variable according to the actual requirements. In the drawing, ten bars 38 are shown along each edge. The upper portion 66 of each support bar 38 is formed with a shoulder 40 which projects laterally outwards from the lifting and lowering device 36. The shoulders provide the required guiding in lateral direction of the conveyor plates 18 and the spacing between the oppositely disposed support bars 38 on the two lateral edges are so dimensioned that a conveyor plate 18 can be brought to bear against the upper portions 66 of the support bars between the outwardly projecting shoulders 40 on both sides of the device 36. For this purpose, the shoulders 40 project upwards beyond the longitudinal lateral edges 42 of the conveyor plate 18. A slight gap 44 must be provided between the longitudinal lateral edges 42 of the conveyor plates 18 and the shoulders 40. The lifting and lowering device 36 with its associated support bars 38 forms together with a servo-motor 46 and a linkage 48 a kind of jack system. On actuation of the driving piston 50 of the servo-motor 46 a link 52 in the linkage 48 is brought into such a position that one end of the lifting and lowering device 36 is raised or lowered. Due to the fact that the link 52 via an articulated rod 54 (illustrated in FIGS. 3 and 4) is connected with a similar link 56, the action of the piston 50 is also transmitted to the other end of the device 36, so that the whole device 36 is raised or lowered in relation to a stationary bed 58. Above the lifting and lowering device 36 is a supporting device 60 comprising two parallel lateral supports 62 consisting of channel bars 62 which are positioned over the two rows of support bars 38. Open portions of the channel bars 62 face one another. Due to the fact that the lower shanks 64 of the channel bars 62 are formed with recesses 68 matching the upper portions 66 of the support bars 38, said bars 38 can be guided relatively the lower shanks 64 of the channel bars 62 in such a manner that supporting portions 70 of the bars 38 reach the same level as the inner surfaces 72 of the lower shanks 64. The channel bars 62 are pivotably mounted in a stationary frame 74 which forms part of the supporting device 60, so that the bars 62 can be swung outwards from one another. Since the pivot centers 76 of the bars 62 are located higher up than the support bars 38, the the channel bars 62 describes a combined outward and upward pivotal movement. The pivoting movement of each channel bar 62 is controlled by an associated servo-motor 78. This operational step is illustrated in more detail in FIGS. 5 to 7.

Figure 5:
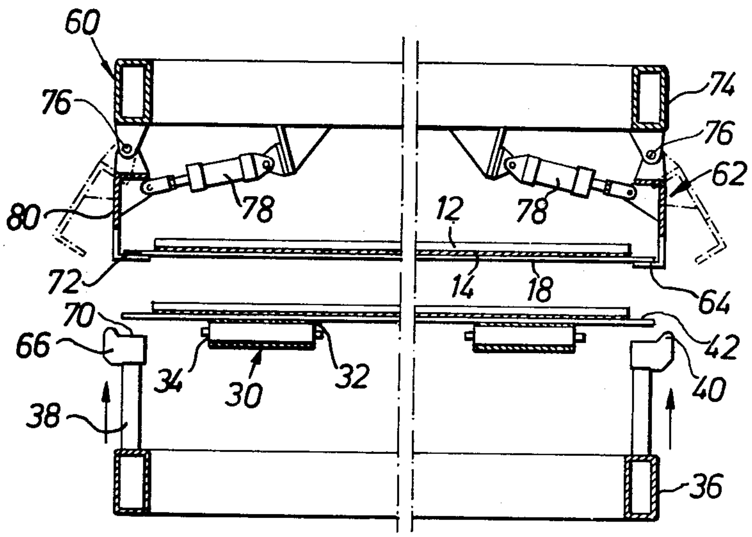
FIGS. 5 to 7 are cross-sectional views of the novel stacking apparatus in different phases of operation.

According to FIG. 5 a first conveyor plate 18 with associated wire cloth 14 and wet sheet or blank 12 has been hoisted from the conveyor means 30 and brought in hoisted position to bear against the inner surfaces 72 of the lower shanks 64 of the channel bars 62. The hoisting of the conveyor plate 18 into the shown position has been effected by means of the support bars 38 in the lifting and lowering device 36 as is indicated in FIG. 5 by means of the vertically directed arrows. During this hoisting operation or at least in the later phase thereof, the channel bars 62 had been in the swung-out position indicated by the dash- and dotted lines in FIG. 5. As soon as the lifting and lowering device 36 had reached its upper end position the bars 62 were swung inwards upon actuation by servo-motors 78 so that the lower shanks 64 will catch the conveyor plate 18 from below. The movement was rendered possible by the above-mentioned recesses 68 in the bars 62. Thus, the upper portions 66 of the support bars 38, including the projecting shoulders 40, were capable of passing through the recesses 68 from the shank end portions to the webs 80 of the channel bars 62. Upon lowering of the lifting and lowering device 36 a new, second conveyor plate 18 with associated wire cloth 14 and blank 12 is brought into position over the support bars 38 which phase of operation is shown in FIG. 5.

Figure 6:
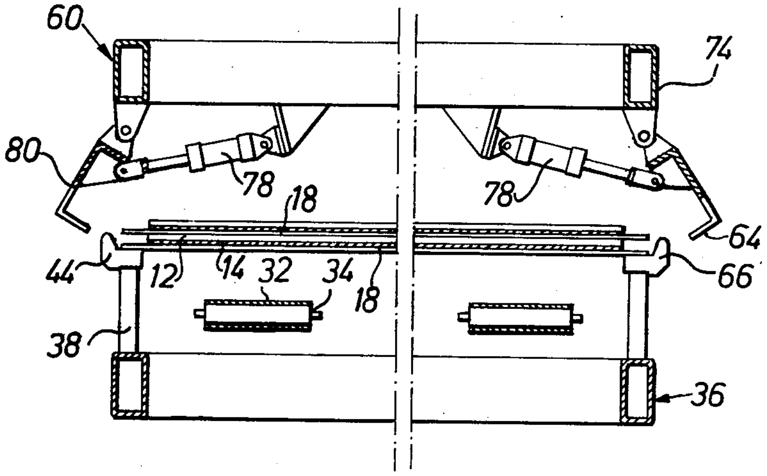

According to FIG. 6, the lifting and lowering device 36 is in an upper position, in which position the bottom side of the first plate 18 has been brought to bear against the top side of the blank 12 of the underlying second plate 18 whereupon the channel bars 62 have been swung outwards. The stacking of two loaded conveyor plates 18 has thus been effected.

Figure 7:
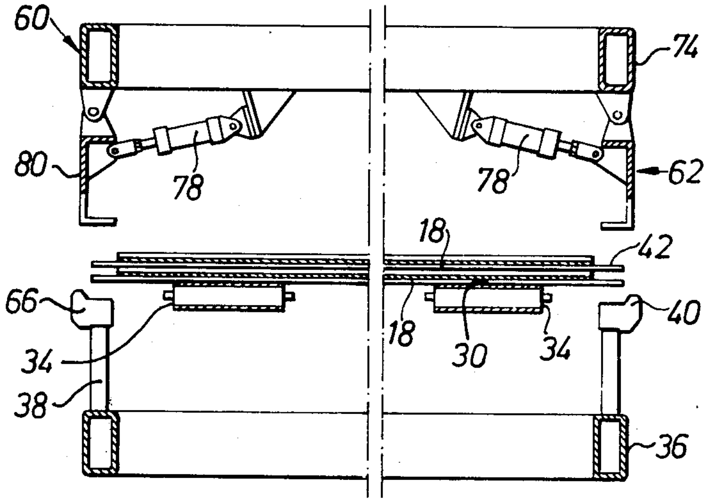

In the operation phase shown in FIG. 7, the two superimposed conveyor plates have been lowered down to the conveyor means 30 and can thus be conveyed further to be fed into the appropriate elevator shelf.

It is easily understood that it is possible with the stacking apparatus described herein to stack additional plates upon one another so that each into the elevator member may, for example, comprise three or four plates.

It should be observed that the stacking apparatus described herein as well as the method of manufacture sheets or board units carried out in the described apparatus are not intended to limit the invention, but that modifications of the same are possible within the scope of the appended claims.

What is claimed is:

1. In a system for producing pressed board and the like, in which the board blanks are pressed in tiers in a multi-opening press, the method of stacking and feeding the board blanks comprising:

a. depositing the board blanks on platens;

b. successively transporting the platens and superposed board blanks by conveyor means into a stacking device at predetermined intervals;

c. raising a predetermined number of platens and superposed board blanks successively above the conveyor means into retained contact with one another to form a stacked assembly of platens and board blanks and d. introducing said stacked assemblies into the tiered opening in the multi-opening press.

2. The method according to claim 1, in which the stacked assemblies are successively racked in tiers and aligned with the tiered openings in the press to be pressed into press board in a single operation.

3. An installation for producing pressed board and the like, in which the board blanks are pressed in a multi-opening press, the installation comprising:

a. conveyor platens for supporting the board blanks;

b. conveyor means for transporting successive platens and superposed board blanks to a stacking device;

c. vertically movable means in said stacking device adapted for successively raising a predetermined number of platens and superposed board blanks above said conveyor means to form a stacked assembly;

d. releasable means in said stacking device for retaining the platens in the raised position during the stacking operation;

e. said vertically movable means being effective to lower said stacked assembly to said conveyor means upon completion of the stacking operation; and f. means for introducing said assemblies to the press.

4. An installation according to claim 3, in which the means for introducing the stacked assemblies to the press comprises elevator means for racking the assemblies in tiers aligned with the tiered openings in the press.

5. An installation according to claim 3, in which said vertically movable means and said releasable retaining means are actuated by servo motors.

6. An installation according to claim 5, in which said releasable retaining means comprise a pair of swingable hooked members adapted to be swung inward by its servo motor into engagement with the undersurface of said platens and retain them in their raised position when said vertically movable means is lowered and disengaged from said platens.

7. A stacking device for board blanks for use in an installation as set forth in claim 3, comprising:

a. a longitudinal lower frame supported on base means and provided with a plurality of spaced oppositely aligned and upwardly extending lateral lift members for supporting and guiding the board blanks;

b. an upper frame mounted a distance above said lower frame member to provide a space for receiving the board blanks;

c. conveyor means for transporting a series of successive blank-carrying platens into said space;

d. a servo motor actuated link system connected to said base means effective to elevate said lower frame to cause said lift members to engage said platens to raise the latter a predetermined distance above said conveyor means;

e. servo motor actuated retaining means pivoted to opposite sides of said upper frame for engaging said raised platens and to retain the same in their raised position while a successive platen is transported into said space and raised by said lift members into contact with said raised member to form a stacked assembly of platens and board blanks;

f. said lower frame being actuated by its servo motor to cause said lift members to engage said stacked assembly to lower the same to said conveyor means upon completion of the stacking operation for further transportation to the board press; and g. said retaining mean being actuated by its servo motor to be disengaged from said stacked assembly when the stacked assembly is lowered by said lift member.

8. The combination with the stacking device as claimed in claim 2, of a multi-opening board press and a tiered elevator means for receiving successive stacked assemblies and elevating the same into alignment with the openings of the multi-opening press.

* * * * *